(No Model.)
P. GERMAIN.
ELECTRIC BATTERY.
No. 365,359. Patented June 21, 1887.
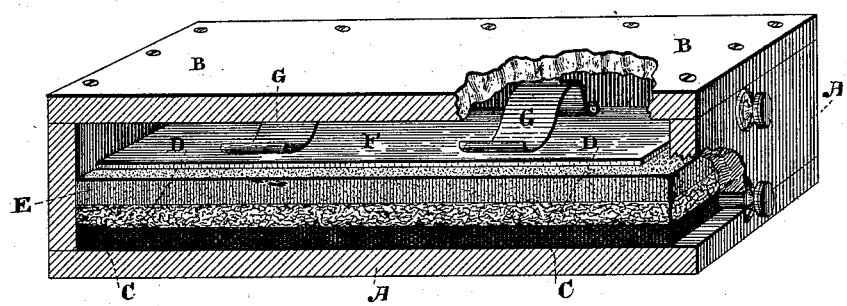

UNITED STATES PATENT OFFICE.

PIERRE GERMAIN, OF CLERMONT FERRAND, PUY-DE-DÔME, FRANCE.

ELECTRIC BATTERY.

SPECIFICATION forming part of Letters Patent No. 365,359, dated June 21, 1887.

Application filed October 4, 1886. Serial No. 215,311. (No model.) Patented in France March 6, 1886, No. 174,494; in Belgium March 22, 1886, No. 72,463; in Germany March 23, 1886, and in Austria-Hungary March 31, 1886.

*To all whom it may concern:*

Be it known that I, PIERRE GERMAIN, of Clermont Ferrand, in the Department of the Puy-de-Dôme, France, have invented certain new and useful Improvements in Electric Batteries, of which the following specification is a full, clear, and exact description.

This invention relates more particularly to electric batteries in which the battery plates or electrodes are separated by a porous body in which the exciting liquid or electrolyte is absorbed.

Heretofore in batteries of this type sand, sawdust, and other substances have been employed; but in consequence of the weight of the material, its small capacity for absorption, its inability to withstand the action of the electrolyte, its high cost, or other cause, these batteries have not been very successful.
In the present invention the difficulties are overcome and a most efficient, economical, and convenient battery is produced by the use of powder of cocoanut-husks. This material is very absorbent, light, and cheap, and is not attacked by the chemical agents used in or formed by the battery. It is formed from the outer part of the husk of the cocoanut after the inner fibrous portion has been removed by means of strong cords. It is a nearly impalpable powder, and is separated from coarser particles and from those which have been soiled by mud or otherwise. Before moistening it with the exciting solution it is dried. It is composed of cellulose, paracellulose, and vasculose—that is to say, it is slightly soluble in part and in part insoluble.

In the battery a layer or body of suitable thickness of the powder moistened with the exciting solution is placed between the electrodes, which latter are in the form of plates, and the whole is held together by the pressure of a spring, weight, lever, wedge, or other mechanical device. Preferably, each cell of battery consists of a covered containing-box, a plate of carbon in the bottom of said box, a layer of binoxide of manganese in pieces mixed with pieces of carbon to increase its conductivity, and moistened with water on the plate of carbon, the body of powder of cocoanut-husk moistened with a solution of sal-ammoniac (ammonium chloride) above the binoxide of manganese, the plate of zinc resting on the said powder, and springs placed between the cover of the box and the zinc plate, and tending to press the plates together. The connections for the exterior circuit are made through the walls of the box at one end of the plates.

The invention also has reference to the preparation of the zinc plate and of the containing-box. The improved preparation of the zinc plate consists in forming the same of a number of thin sheets of zinc, (say half a millimeter in thickness,) which are dipped into an amalgamating bath (mercury and acid) and then superposed and caused to adhere. The zinc is thus amalgamated throughout. The upper or inactive side is or may be coated with tar. Under the action of the battery a chloride of zinc soluble in water is formed. The mercury stays between the zinc plate and the separating medium or powder of cocoanut-husks. The chloride of zinc dissolves and filters through the separating medium into the interstices between the binoxide of manganese. The containing-box is preferably made of wood coated inside with an elastic insulating-varnish of yellow wax, paraffine, and resin in equal parts. The materials are melted together, the mixture is poured into the containing-box, and then emptied out of it.

An electric accumulator or secondary battery can be made of lead plates of any ordinary or suitable construction, separated by a body of powder of cocoanut-husks moistened with a suitable exciting-liquid. It is preferred to use water strongly acidulated, the excess of sulphuric acid compensating for the decrease in conductivity. Instead of acidulating with one-tenth acid, one-eighth acid is used. It is preferred to charge the accumulators with the improved primary batteries, instead of connecting them with a dynamo.

In the accompanying drawing a cell of battery constructed in accordance with the invention is represented in section with part of the containing-box broken away.

A is the box of wood, coated with varnish inside, and B the cover therefor; C, the plate of carbon; D, the mass of binoxide of manganese and carbon in granules, moistened with water; E, the body of powder of cocoanut-husks moistened with a solution of ammonium chloride; F, the plate of zinc amalgamated throughout and coated on the back or upper part, and G springs interposed between the cover B and the zinc plate F, and serving to press the latter against the body of powder E, so that it remains in contact therewith in all possible parts of its surface. The body of powder E is compressible; but the pressure simply causes a slight exudation at the surfaces thereof. Each electrode has a binding-post connected therewith through the end of the box. The connecting-wires are or may be protected with insulating material. The proportions of materials used in the battery may be, by weight, about as follows: One part of zinc, two parts of chloride of ammonium, two parts of binoxide of manganese, with a suitable quantity of granular carbon in addition, two and three-quarter parts of water, and one-fifth part of powder of cocoanut-husks. The powder may be added to a saturated solution of ammonium chloride, the purer the better, at one 100° centigrade. It should absorb all the liquid without the latter exuding freely under a light pressure.

The advantages of a battery embodying the improvements described are as follows: The zinc is consumed uniformly over its surface. It remains clean, and does not become coated. It is almost entirely consumed, and therefore there is very little waste. The separating medium or powder of cocoanut-husk retards evaporation of the liquid, which is noticeably less than customary. Consequently less attention in supplying water is required. Efflorescence hardly takes place at all, and only under abnormal conditions. There are no liquids to spill. The battery can be reversed without injury. No fragile or brittle containing-vessels or porous cups are needed. There is no infiltration of dust or other foreign material. The extreme subdivision of the liquid and of the oxygen of the air absorbed thereby seems to augment the electro-motive force of the battery, as compared with one using a free liquid, (Leclanché's, for example.) The cocoanut powder wet with the solution is readily traversed by the electric current and the gases of polarization.

The improved battery is useful for military or municipal telegraphs, for railway-signaling, for telephone-lines, for electric bells, for charging secondary batteries, and for other purposes.

It is evident that modifications may be made in details without departing from the spirit of the invention, and that parts of the invention may be used separately.

Having now fully described my said invention and the manner in which the same is or may be carried into effect, what I claim is—

1. In an electric battery, and in combination with the electrodes or battery-plates thereof, the body of powder of cocoanut-husks moistened with the exciting liquid or electrolyte, substantially as described.

2. An electric battery comprising, in combination with the electrodes or battery-plates, an interposed body of powder of cocoanut-husks moistened with the exciting liquid or electrolyte, and springs tending to compress the said body so as to keep the electrode against the same and to favor the exudation of the said liquid, substantially as described.

3. An electric battery consisting of a carbon plate, a mass of binoxide of manganese in contact therewith, a zinc plate, a body of powder of cocoanut-husks between the zinc plate and the binoxide of manganese, and a solution of ammonium chloride absorbed by said powder, substantially as described.

4. A battery plate or electrode of zinc amalgamated throughout, the same being composed of a number of sheets separately amalgamated and united, substantially as described.

5. The method of preparing amalgamated electrodes for electric batteries, by subjecting sheets to the amalgamating bath or liquid and then superposing and uniting a number of such sheets, substantially as described.

6. An electric battery comprising, in combination with an opposing electrode, an electrode of zinc amalgamated throughout, and a body of powder of cocoanut-husk moistened with an exciting liquid or electrolyte and interposed between the electrodes, substantially as described.

7. An electric battery composed of the covered containing-box, the carbon electrode, the binoxide of manganese, the powder of cocoanut-husks, the exciting liquid or electrolyte absorbed by said powder, the amalgamated zinc electrode, and the springs, substantially as described.

In witness whereof I have hereunto signed my name in the presence of two subscribing witnesses.

PIERRE GERMAIN.

Witnesses:
ANTHONY POLLOK,
ROBT. M. HOOPER.